US008024313B2

(12) United States Patent
Mousavi et al.

(10) Patent No.: US 8,024,313 B2
(45) Date of Patent: Sep. 20, 2011

(54) SYSTEM AND METHOD FOR ENHANCED DIRECTION OF AUTOMATED CONTENT IDENTIFICATION IN A DISTRIBUTED ENVIRONMENT

(75) Inventors: Kianoosh Mousavi, Ottawa (CA); Benson J. Wong, Brampton (CA); Khalid El Mously, Ottawa (CA)

(73) Assignee: Protecode Incorporated, Ottawa, Ontario (CA)

( * ) Notice: Subject to any disclaimer, the term of this patent is extended or adjusted under 35 U.S.C. 154(b) by 522 days.

(21) Appl. No.: 12/149,889

(22) Filed: May 9, 2008

(65) Prior Publication Data
US 2009/0281995 A1 Nov. 12, 2009

(51) Int. Cl.
G06F 7/00 (2006.01)
G06F 17/30 (2006.01)
(52) U.S. Cl. .................... 707/706; 707/799
(58) Field of Classification Search .......... None
See application file for complete search history.

(56) References Cited

U.S. PATENT DOCUMENTS

| 5,263,155 | A  | * | 11/1993 | Wang | 707/695 |
| 5,907,837 | A  | * | 5/1999  | Ferrel et al. | 1/1 |
| 7,293,020 | B2 | * | 11/2007 | Beylin | 709/201 |
| 7,844,973 | B1 | * | 11/2010 | Dice | 718/108 |
| 2004/0220926 | A1 | * | 11/2004 | Lamkin et al. | 707/3 |
| 2006/0112130 | A1 | * | 5/2006 | Lowson | 707/102 |
| 2007/0038614 | A1 | * | 2/2007 | Guha | 707/4 |
| 2007/0299825 | A1 | * | 12/2007 | Rush et al. | 707/3 |

OTHER PUBLICATIONS

Tapas Som; A probabilistic event scheduling policy for optimistic parallel discrete event simulation; 1998; ACM; pp. 1-8.*

* cited by examiner

*Primary Examiner* — Neveen Abel-Jalil
*Assistant Examiner* — Jermaine Mincey
(74) *Attorney, Agent, or Firm* — Freedman & Associates

(57) ABSTRACT

The successful development of digital production content within a development organization requires that the intellectual property rights of the multiple elements of digital content introduced into the digital production content. According to the invention there is provided a means of automatically identifying the source, licenses and other associated intellectual property information associated with the digital content introduced. The invention providing for the direction of a dynamic search engine according to metadata relating to the digital content produced, wherein the digital content introduced is not identified within existing databases of intellectual properties indexed according to digital content. Further the invention provides for interfacing the dynamic search engine with a web crawler to data mine a region of the World Wide Web around the location of the digital content introduced determined by the dynamic search engine.

3 Claims, 8 Drawing Sheets

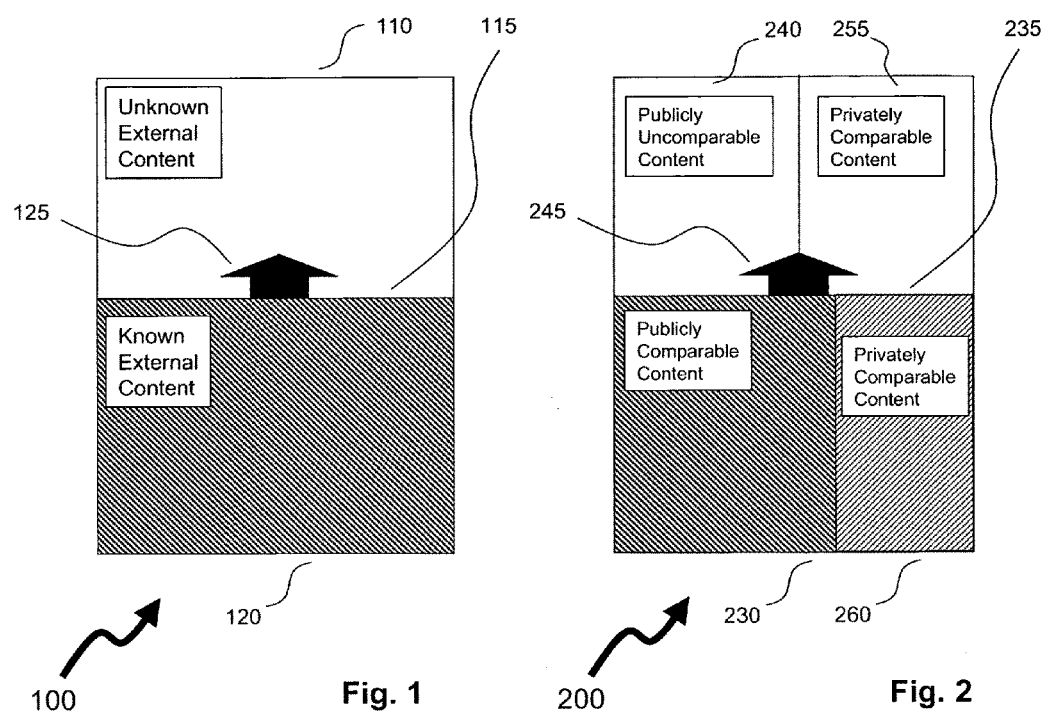

SYSTEM AND METHOD FOR ENHANCED DIRECTION OF AUTOMATED CONTENT IDENTIFICATION IN A DISTRIBUTED ENVIRONMENT

FIELD OF THE INVENTION

The invention relates to content search engines within communication networks and more particularly modifying the search engine according to actions of electronic content developers.

BACKGROUND OF THE INVENTION

Digital content has been developed for as long as computers have been around. It exists in the form of computer programs, text documents, digital images, digital video, digital audio, software components, and blocks of computer code. Digital content producers integrate, compile and distribute digital content production to end-users who want it for the value, and not for the technology. Examples of such producers include software vendors, web site designers, and audio-visual content producers. During recent years, these organizations producing digital content have chosen, or been forced to, leverage externally developed content to gain efficiency in research and development. As a result, some organizations have chosen to develop digital content components for distribution not to end-users but to digital content producers themselves. For example, some companies sell digital photographs to web-site producers for use in their web sites. Another class of content producer has emerged that has chosen to produce digital content or digital content components and then distribute them for free, or with liberal licenses. A subset of these free content developers has chosen to distribute their content freely, but licensed in a way that requires content producers who use their free works either directly or to produce derivative works, to release their work under the same terms. Another trend in content development is the advent and increasing use of the Internet and the world-wide web.

Finding digital content has become easier, faster, and acceptable, to the extent that it is often expedient for digital content developers and their companies to acquire digital content or digital content components from the Internet and produce a derivative work, rather than producing original content from scratch. Alternatively developers are increasing merging externally sourced digital content, or digital content components, and embedding them within their own digital content. For example, a developer generating software for an MP3 music player might download and embed a search algorithm, allowing the user to easily search for the song they want, or an enhanced display driver produced by another developer already using the same LCD display for example.

Whilst the increased breadth and speed of access globally to digital content has significantly eased the digital content development process, the commercial enterprises ability to establish the intellectual property rights of digital content has gotten more difficult, and increases in complexity continuously as developers select, embed in real time, and in some instances with multiple development teams globally distributed to provide 24 hour code development, or addressing multiple elements of the digital content. Knowing these intellectual property rights is crucial when establishing the valuation of businesses that derive revenue or cut costs from generating and distributing original digital content, such as software companies, or companies that use digital content to derive revenue or cut costs such as television broadcasters. When a business is being audited and evaluated, they must produce accurate records detailing all external digital content in their digital content systems, including the copyright ownership, license agreements, and other terms and conditions. Given that it only takes seconds to copy significant amounts of external digital content into an enterprise, using anything from subsystem copying, downloading software from the Internet, and cutting and pasting images and text from hypertext documents from the Internet, the continuous monitoring and establishment of these property rights is difficult.

For a digital content provider a typical high-level process for documenting external content is as follows:

Identify and document each piece of external digital content in your digital content system;

Compare each documented piece of external content with publicly comparable external content, and if there is a match annotate the content with copyright owner, license, author(s), etc;

Compare all of your content with publicly comparable content, and if there is a match annotate the content with copyright owner, license, author(s);

For the remaining external content still not annotated, annotate them manually to the best of your ability with the copyright owner, license, author(s), etc Intellectual property lawyers and software experts are often brought into the digital content developer business to drive this process, and key content developers and project leaders must spend much time compiling these lists and reports. In reality this process is often prohibitively expensive because it requires manual labor and guesswork by highly qualified and expensive intellectual property lawyers and content developers. It is also error-prone, and subject to abuse by developers' intent on hiding the source of their specific portions of the overall code forming the digital content offered by their employer or contract provider.

Additionally a large volume of digital content, such as for example a software suite or video game, may have a significant number of inserted portions of external content from a similarly large number of sources. Many such sources may in fact be private repositories of digital content, individuals developing digital content or other sources which are difficult to locate, access and verify that the digital content they host was employed within the produced digital content.

It would therefore be beneficial for digital content providers and developers to have available a centralized repository of information relating to external digital content allowing effective automation of the process described above, and thus enabling them to confidently declare the intellectual property ownership of their digital content productions. Additionally it would be beneficial for digital content providers and developers to have a means of bringing uniformity to both the digital content and the digital content metadata, thereby reducing content production costs and/or liabilities. Such uniformity is typically established via policies or rules within a development organization, each organization having different policies. In these policies and rules many of the aspects affecting the development organization are not necessarily those the developer focuses to in sourcing and introducing external content. Hence, a developer may be more interested in aspects such as file size, speed of processing, code complexity, image resolution, etc, whereas the development organization is concerned with licensing, territory restrictions, copyright, cost of use, organization sourced from, etc.

As a result any automated or even non-automated means of verifying, checking, reviewing any aspect of external digital content introduced into the development environment and introduced to a digital content under development therefore benefits from access to the fullest extent of information relating to that external digital content. As such it would be beneficial to identify such external digital content upon its introduction and extract the fullest extent of information from a centralized repository of information relating to external digital content. It would be typical for such a centralized repository to employ search engines (typically referred to a web crawler) to explore the Internet, identify digital content and store all related information gathered from the external source in association with the external digital content so that it is available to development organizations.

It would be evident that given the immense number of files upon the Internet (World Wide Web) and the rate at which this content is increasing that the web crawlers of a centralized repository have a very difficult task, perhaps one that is not achievable without expending unsustainable resources, to initially identify all new sources, identify content and extract the pertinent data for the activities discussed supra. Additionally the web crawlers should periodically return to all identified digital source locations to identify new content, verify previously identified contents information, or establish modifications to such previously identified external content. A development organization may therefore suffer delays in establishing the verified information relating to an item of external digital content that impact the development of their digital content.

It would therefore be advantageous for the web crawlers to have information relating to the activities within a development organization to establish a weighting in the search activities of the web crawlers. Accordingly a file modification event within a development organization provides data relating to external digital content introduced to adjust in a predetermined manner the activities of the web crawlers.

Accordingly the invention provides a method of automatically adjusting activities of dynamic search engines and web crawlers accessing distributed publicly and privately accessible sources of digital content to improve both decision making of development organizations introducing such digital content into their activities and the establishment of the appropriate intellectual property rights and accreditation.

SUMMARY OF THE INVENTION

In accordance with the invention there is provided a method comprising at least a process of a plurality of processes, each process relating to automatically sourcing at least an element of a plurality of elements, each element relating of an aspect of an external digital content at least one of to be introduced and introduced into a digital content file.

In accordance with another embodiment of the invention there is provided a method wherein the aspect of the external digital content is selected from the group comprising, a file length, a file size, a file type, a file format, an author, a copyright, a license, an owner, and an aspect of the content of the external digital content.

In accordance with another embodiment of the invention there is provided an apparatus comprising at least a processor, the processor executing at least a process of a plurality of processes, each process relating to automatically sourcing at least an element of a plurality of elements and each element relating to an aspect of an external digital content at least one of to be introduced and introduced into a digital content file.

In accordance with another embodiment of the invention there is further provided at least a dynamic search engine, the dynamic search engine for automatically searching at least one source of digital content of a plurality of sources of digital content connected to a communications network and performing the search in dependence upon at least a provided data term of a plurality of data terms stored in a memory, the plurality of data terms relating to the external digital content.

DESCRIPTION OF THE DRAWINGS

Embodiments of the invention will now be described in conjunction with the following drawings, in which:

FIG. 1 depicts a boundary between known external content and unknown external content;

FIG. 2 depicts a boundary between publicly or privately comparable content and publicly or privately uncomparable external content;

DETAILED DESCRIPTION OF EMBODIMENTS OF THE INVENTION

Figure 3:
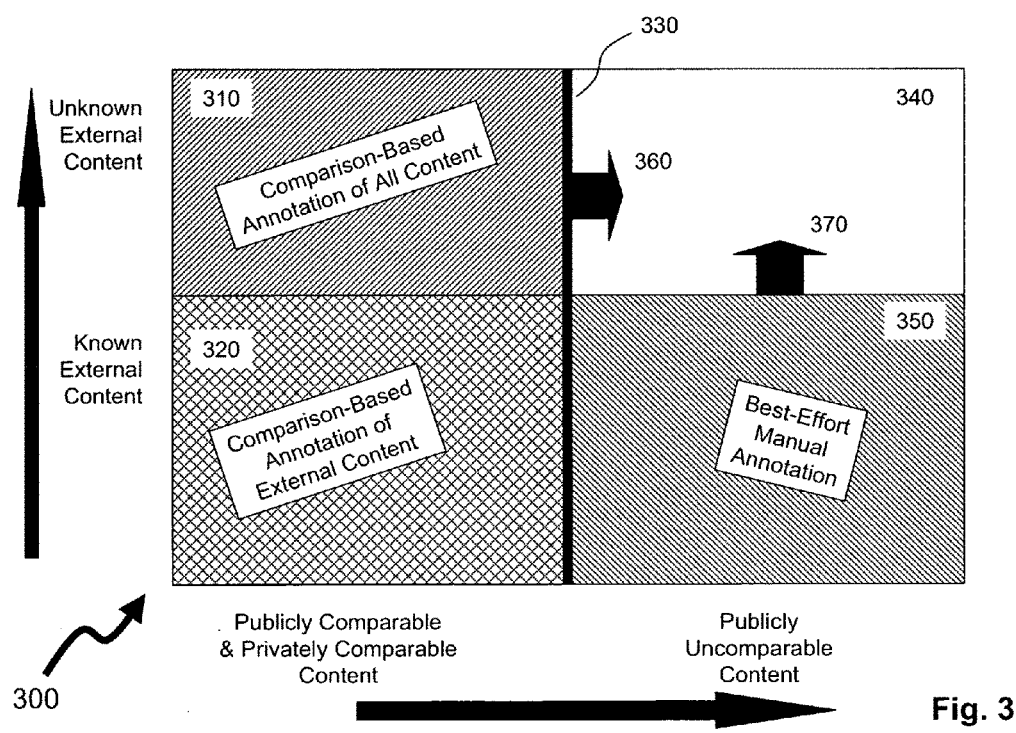
FIG. 3 depicts the combination content assignment from gathering external content records, public comparison based annotation content, and best effort annotation content.

Referring to FIG. 1 there is depicted a schematic 100 of known external content 120 and unknown external content 110. Each of the known external content 120 and unknown external content 110 being electronic content exploited by a developer of electronic content that it did not develop itself. Examples of such external content including fully formed source code files, subroutines or partial source code files, images, audiovisual content, and software libraries. Further, the external content may also include partial data buffers storing displayed code, code snippets, image snippets, and audiovisual clips. The schematic 100 in depicting known external content 120 and unknown external content 110 outlines the portion of the electronic content for the developer to establish proper ownership and licensure of intellectual property. The arrow 125 represents the desire to improve the identification of external content in order to reduce the amount of unknown external content and risk to the developer commercially.

Within the prior art the typical process of moving arrow 125 higher and reducing the unknown external content 110 consists of asking the software design team to gather a list of third party components and licenses, sending it to the lawyers, and then verifying ownership. Typically, such an approach from several flaws including, but not limited to did the designers include everything, did designers deliberately not include something, were libraries and runtime systems included, and were libraries included with the host operating system included.

Even where all such external content is reported, additional errors in the software design team reporting can occur as the actual external content whilst identified may actually have been sourced from another external source-than the specific one used by the developer. In such instances the external content may actually be different to that the designer thinks they have downloaded, and may require a completely different licensing agreement. Accordingly verifying and validating external content becomes important to reducing risk for a development organization. It would be apparent that this is more readily achieved where the content is publicly comparable. Publicly comparable content is electronic content that can be "compared" to without requiring the owner of the publicly comparable content to grant access to the comparison mechanism, such as for example the Linux kernel. Additionally a development organization may also have access to privately comparable content as the result of business relationships, partnerships, etc.

As shown in second schematic 200 of FIG. 2 depicting the four domains digital content being employed within a development organization may reside within. These being publicly comparable content 230, privately comparable content 260, publicly uncomparable content 240, and privately uncomparable content 255. Public content being that searchable generally through the Internet or World Wide Web (WWW) for example, whilst private content refers to content stored on systems not identifiable from general searches but known to the development organization or an intellectual property service provider through agreement. Accordingly there is outlined a boundary 235 between the portion of the electronic content for which the developer can establish proper ownership and licensure of intellectual property and that which they cannot. The trend arrow 245 represents the desire to improve the identification of external content by public comparison in order to reduce the amount of unknown external content and risk to the developer commercially. The association of ownership and licenses with external content incorporated in a developers electronic content increases the certainty for a business that it's developed electronic content is free of intellectual property conflicts. This process is described hereinafter as annotation, and comprises two forms, comparison-based annotation and best-effort annotation.

Referring to combination effect schematic 300 of FIG. 3 then these steps presented supra provide a development organization with the comparison-based annotation of external content 320 a disclosed by its development team, and the comparison-based annotation of all content 310. As shown boundary 330 does not sit to the extreme right of the combination effect schematic 300 indicating that there is still external content that didn't have a publicly comparable owner. To complete the process best-effort annotation 350 is performed by the development organization. In this best-effort annotation for each element in the external content list that didn't match to publicly comparable content, the development organization annotates the content, author, copyright ownership, and license to the best of its ability.

Moreover, as shown by the arrows 360 and 370 in the combination-effect schematic 300, as the methods of external content identification improve and the amount of publicly comparable software improves, the amount of unknown external content 340 that is publicly uncomparable diminishes, thus reducing the risks of intellectual property liability. However, many aspects of the approach rely upon the intentions of the electronic content development team being aligned with those of the development organization.

According to various embodiments of the invention described below in the searching, identification and extraction of external digital content and associated information, such as copyright and licensing to reduce the extent of unknown external content 340, an automated searching mechanism of the Internet ("WebCrawler") is provided wherein searching is adapted in response to the actions of the development team in incorporating electronic content is presented. These embodiments are presented and described with respect two fundamental units of intellectual property in respect of electronic content in a system, be it a single computer under the control of a single developer to a multinational development team operating globally across multiple server farms, the Internet and computer systems.

The first fundamental unit is the file. Ultimately, electronic content depends on combining one or more files. These can include, but not be limited to, source code files, build scripts, images, audio files, video files, binary files, and software libraries. An embodiment of the invention captures the creation, import, deletion, modification, moving, and renaming of all files or parts of files used to build a system of electronic content such as a software application or subsystem. Any new file or portion thereof, which may optionally be electronic content over an optionally specified predetermined size limit, is logged as external content associated with that file.

The second fundamental unit is the buffer. In some cases external content is brought into a system by cutting and pasting from other sources such as a web browser, a file browser, or from within a content-specific editor or viewer. Ultimately, each such cut-and-paste operation involves the transfer of a buffer of data from an external source into the electronic content file, which as noted above is logged according to an embodiment of the invention. In this manner any new buffer, against beyond a predetermined size that is introduced into the monitored electronic content file is logged as external content associated with that file.

Figure 4:
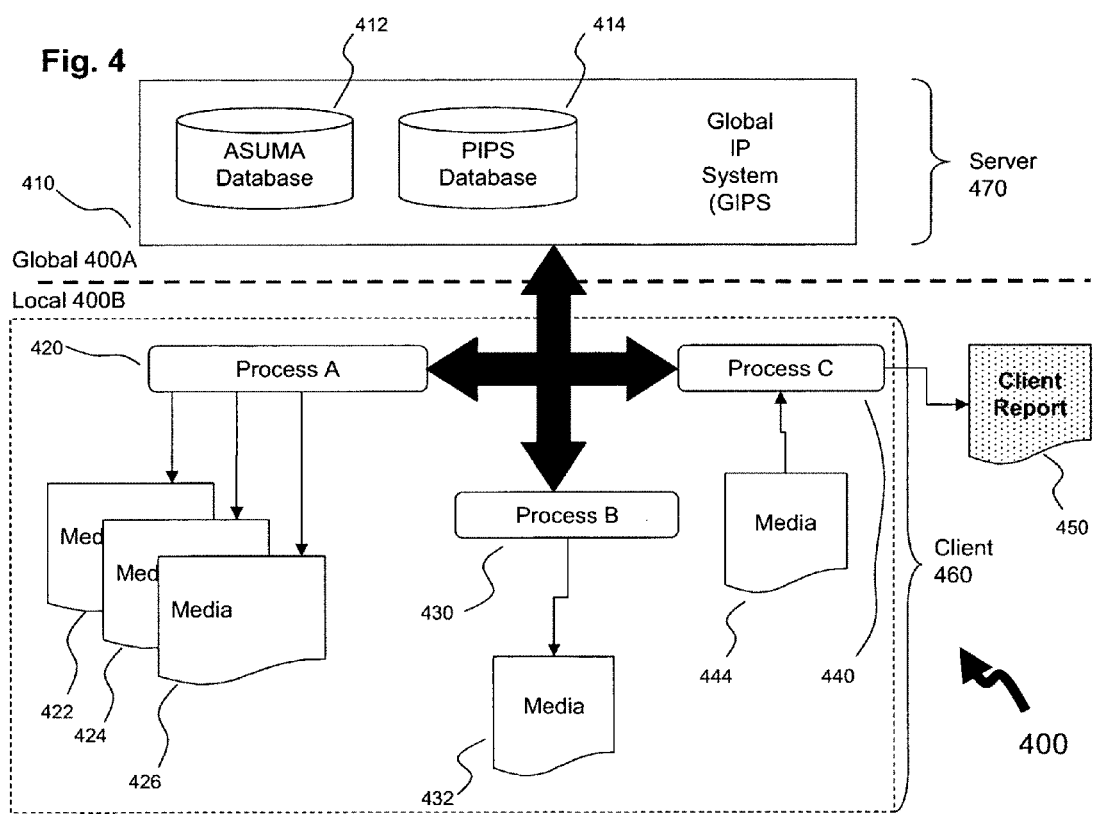
FIG. 4 depicts an embodiment of the invention in respect of an intellectual property tracking system based on client-server architecture consisting of global and local layers.

Now referring to FIG. 4 there is shown an overview of an embodiment of an intellectual property tracking system 400 based upon a client 460 and server 470 architecture with consisting of global layer 400A and local layer 400B. Within the global layer 400A there is a Global Intellectual Property System (GIPS) 410 that contains various levels of detailed information regarding all known digital content, together with digital content coded by the intellectual property tracking system 400. This information including but not limited to the corresponding licenses and rights management data for each element of digital content.

As shown the GIPS 410 provides various controlled and secure access methods to various users and administrators of the intellectual property tracking system 400. Additionally the GIPS 410 provides fast and reliable search mechanisms, including for example convergence search methods wherein the outcome of each stage of searching is the input for the next stage, thus narrowing the search domain as it progresses and providing bounds of a search domain should an exact match not be found.

Also within the GIPS 410 is Protecode™ Intellectual Property Stamp (PIPS) database 414 which comprises IP information such as licensing and rights management data for digital content stamped by Protecode™ intellectual property software. Each entry within the PIPS database 414 is a PIPS file digest that is a fixed length hash, a hash being a mathematical function for turning data into a relatively small integer number. The hash for the PIPS file digest is calculated over the source digital content which therefore can uniquely identify that source digital content file to a very high degree of probability. In fact it is desirable that even the slightest change in the digital content file results in a very different PIPS file digest. Further the PIPS of subject digital content file, and its corresponding Media file which is utilized to record all pedigree information of a specific digital content subject file, not only serve as a unique identifier of each element of digital content, but also uniquely identifies their relationship and its integrity.

The PIPS file digest within this embodiment is at most 1024 bits long. An example of such hash would be SHA-1, see Secure Hash Algorithm—1 published by N.I.S.T as part of the U.S. Federal Information Processing Standard. SHA-1 generates a 160 bit result and can hash files up to $2^{64}-1$ bits, i.e. 2 mega-terra bytes in size, with extremely low probability of repeated hash results for disparate digital content. In addition to the result of the hash function the PIPS digest file also contains information about the digest itself. This information for example may include digest type, digest version, time stamp, length, and intellectual property policies.

Further, the GIPS 410 also contains an Administration, Subscription, User Management and Accounting (ASUMA) database 412 which contains all user and usage related data. Such data including, but not limited to, user ID, user name, user location, user address, user contact details, organization ID, organization location, account type, account expiration, project identity, project type, project administrator and policies.

The Administration subcomponent of ASUMA database 412 may for example allow administration access to the server as well as providing configuration tools for all other server subcomponents. The Subscription subcomponent could provide registration, subscription, renewal and cancellation access to the system to various users and administrators and may be accessed for example via an Application Programming Interface (API) or a Web Interface. Typical registrations being individual or group, a group for example being an organization registering multiple users.

The User Management subcomponent of the ASUMA database 412 may provide oversight of all user management aspects of the GIPS 410. The user information managed by this subcomponent is typically accessed and used throughout the intellectual property tracking system 400 for record keeping. Finally the Accounting subcomponent, working closely with the Subscription and User Management subcomponents to keep track of all accounts and the respective information and handling.

The GIPS 410 operating in the global layer 400A interfaces to several applications operating within the local layer 400A on the Client 460 systems. These applications may access multiple files, but within this embodiment they all access a file format referred to as Media, see Media 422, 424, 426, 432 and 444. Every element of digital content having at least one Media associated with it in the system.

In respect of applications interfacing to the GIPS 410 then the Client 460 is shown having several processes active that engage with the GIPS 410 and Media 422, 424, 426, 432, and 444. The first of these, Process A 420 may be add-on or plug-in to the development environment of digital content and within this embodiment keeps track of changes to a subset of all the Media, in this case Media 422, 424, and 426. Further based on predetermined options Process A 420 records information about possible external contamination in the Media. As shown Process A 420 is interfaced to Medias 422, 424, and 426 which each relate to an element of digital content and will have the pedigree information at any point in time. For example first Media 422 may relate to a sub-routine providing user log-in, second Media 424 may relate to an image file comprising the logo of a financial institution, and third Media 426 may relate to digital content providing a user interface for paying bills online with a financial institution.

A second application interfacing to both the GIPS 410 and the Process A 420 is the Process B 430. Within the development environment there are many instances where several subject files, digital content, are combined to create a new entity such as an integrated product. Considering the example above the Medias 422, 424, and 426 could provide the core of an online financial system by virtue of providing user log-in, logos for display, and user interface for financial transactions respectively. The second process, Process B 430 will do the same to generate Media 432 as the software developer does in combining many elements of digital content into a single program, not shown for clarity. As such the Process B 430 may work to create Media 432 with the relevant pedigree information for the resulting product, this pedigree being determined in dependence upon the plurality of digital content, and accordingly their associated Media files, such as Media 422, 424 and 426.

Finally as shown the GIPS 410, which engages Process A 420 and Process B 430, also engages with a third process, Process C 440. Capable of operating as a stand alone application, Process C 440 utilizes the information in the Media, for example Media 432, in consolidation with the information in GIPS 410 to generate a Client Report 450. The Client Report 450 may be provided in various levels of detail, normally in XML format, and can be easily reshaped to any desired format using XSLT or similar transformation techniques.

Accordingly a Client 460 developing digital content accesses the GIPS 410 within the Server 470 of the global layer 400A. However, they also routinely engage ASUMA database 412, and PIPS database 414. As a result the overall intellectual property tracking system 400 allows content developers or content development organizations to perform a variety of intellectual property functions including, but not limited to:

tracking the pedigree of the digital content during development;
tracking the pedigree of external components which are included in the project during development, packaging and/or delivery process;
identifying external components which are included without adequate pedigree, contamination;
identify external contamination of intellectual properties;
identify degree of risk associated with particular external contamination;
identifies areas of potential contamination and associates a safety confidence value;
identify applicable licenses to final release and/or any subcomponent of the released product;
identify potential conflicting applicable third party licenses;
providing varying degrees of detailed reports regarding pedigree, external contamination etc of digital content product and appropriate licenses and risks associated with it;
establish warnings and error management based on user privileges;
establish foreground and background intellectual property within a development environment;
provides tools to capture details about third-party components/tools/libraries usage;

introduces a partially searchable stamping mechanism to allow fast real-time identification of stored or unknown stamps;

allows post production fine-tooth-comb scanning of the product for potential undetectable hazards and unintentional contamination;

provides a central searchable database of available known content to allow for lookups; and allows deletion, manipulation and aggregation of digital content in both partial and complete form within the digital content development environment.

Figure 5:
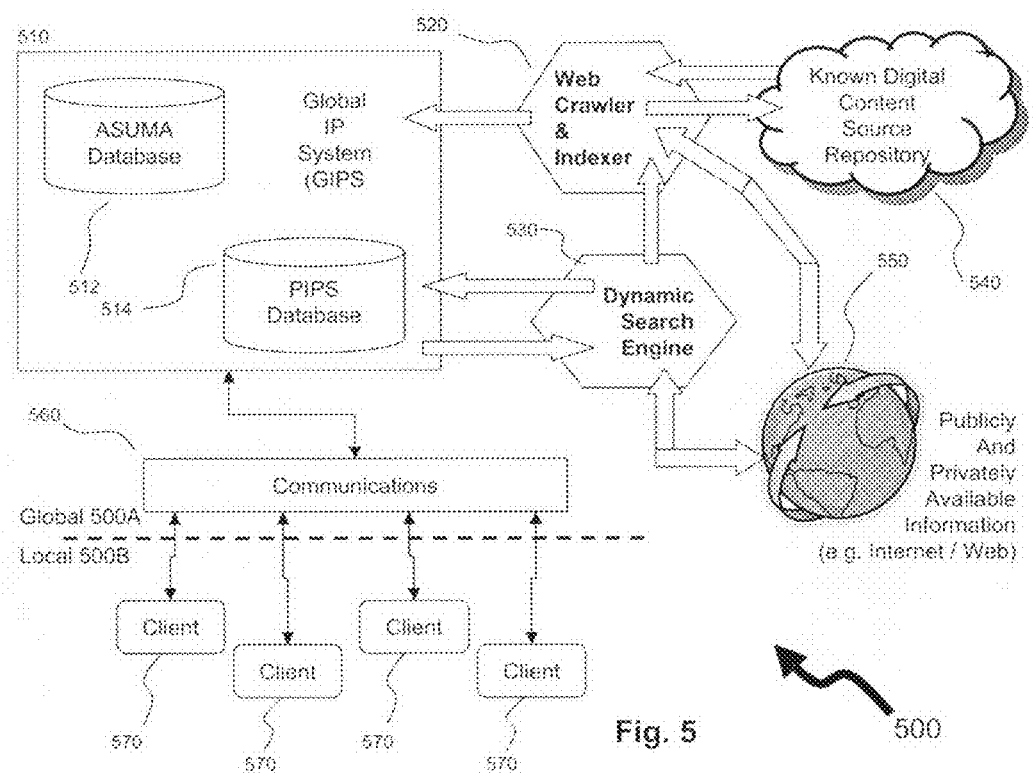
FIG. 5 depicts an embodiment of the invention in respect of an intellectual property tracking system with emphasis to the global layer and depicting a dynamic search engine, a web crawler, and their corresponding interactions.

Now referring to FIG. 5 there is shown an embodiment of the invention via an intellectual property tracking system 500 with emphasis to the global layer 500A. As shown the local layer comprises a plurality of clients 570, each of whom may for example be operating the local intellectual property system as depicted supra in respect of FIG. 4 by the client 460 and incorporating for example Process A 420, Process B 430, and Process C 440. Each client 470 interfaces in this embodiment with the GIPS 510 via a Communications 560 rather than directly as supra in FIG. 4.

The GIPS 510 comprising an ASUMA database 512, PIPS database 514 as well as the Global Intellectual Property System application. The GIPS 510 is shown connected to a Dynamic Search Engine 520. In the event that a request from a client 570 for information relating to digital content results in the GIPS 510, through accessing the PIPS database 514, determining that the requisite signature lookup or information is either not found or incomplete then the GIPS 510 engages the Dynamic Search Engine (DSE) 520. The DSE 520 then actively or passively dispatches a search of publicly or privately available information 550, including for example World Wide Web, to try to find the unidentified digital content. The triggered search can be done using metadata relating to the digital content that is made available either through GIPS 510, from the client 570, a media 426, or provided by the end user (not shown for clarity) as annotation.

The results from searching publicly available information 550 returned to the DSW 530 are then compared with the original request's signature to confirm whether a match has been made. Once the match is confirmed the result can be immediately sent back to GIPS 510 wherein it is made available to the PIPS 514, and may also be provided directly to the client 570. Additionally the details of the location providing the match, for example Universal Resource Locator (URL) and filename, are forwarded to Web Crawler and Indexer 520. As a result the Web Crawler and Indexer 520 searches the vicinity of the match found to add any missing or relevant digital content or information relating to the digital content. The information extracted from the vicinity of the found result is provided to the GIPS 51.

In addition to searching the publicly and privately available information 550 the Web Crawler and Indexer 520 also searches known digital content source repository 540. Known digital content source repository 540 being one of a plurality of such repositories that host digital content of known pedigree. Examples of such repositories include digital image libraries, such as Flickr™, iStockPhoto®, GettyImages®, music libraries, such as iTunes™, and software libraries such as SourceForge™, Numerical Algorithms Group, and Princeton Software Repository.

As a result the intellectual property tracking system 500 provides an immediate analysis of the pedigree, credentials, licenses etc of digital content used by a client 570 through the Communications 560 and GIPS 510 but also provides subsequently additional as well as missing information to the client 570 based upon the search of both publicly available information 550 and known digital content source repository 540. Further the provision of these elements relating to the digital content based upon the Web Crawler and Index 520 and DSE 530 allows the PIPS database 514 and GIPS 510 to be either provided with missing information, updated information or verify information.

Optionally the publicly available information 550 is more than just the Internet domain addresses that are publicly accessible. Within the publicly accessible information may be additional search domains that are made available to the enterprise providing the GIPS 510 and accompanying services. Such search domains may be available to the enterprise publicly or privately, and may include for example third party software providers. For instance Company ACME Inc. may decide to allow the enterprise to search their proprietary source code to alert others if they are using it.

Figure 6:
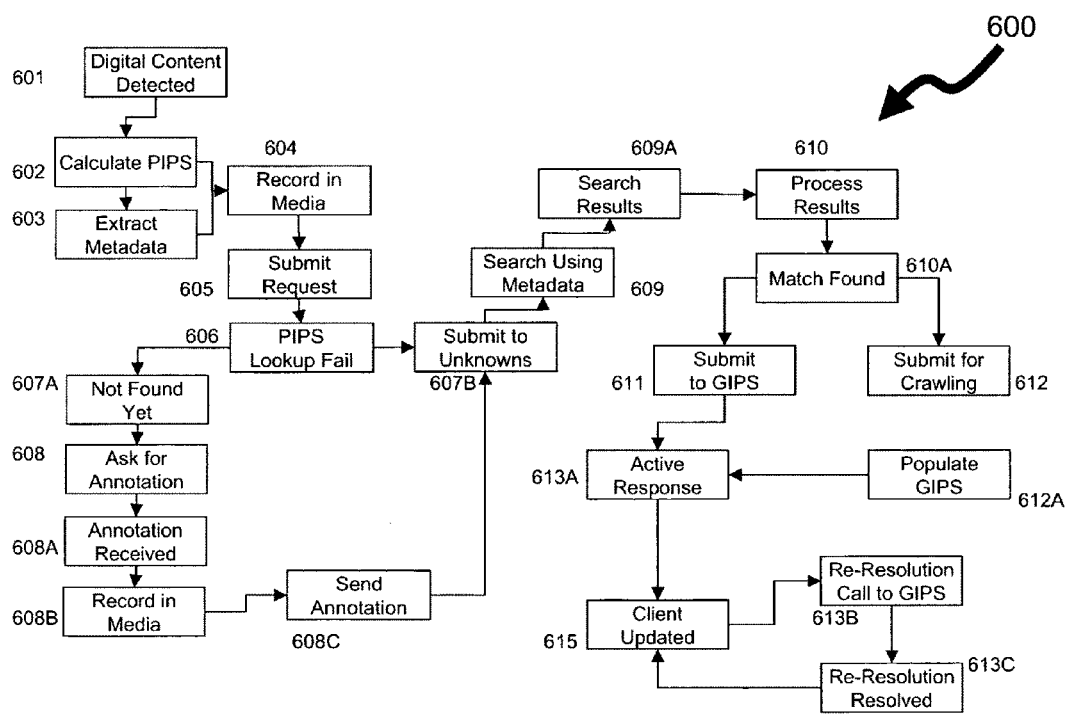
FIG. 6 depicts a flow of information within an intellectual property tracking system according an embodiment of the invention with a dynamic search engine and resolution of unknown content.

Now referring to FIG. 6 there is depicted an information flow 600 within an intellectual property tracking system according an embodiment of the invention, such as intellectual property tracking system 500 of FIG. 5, with a dynamic search engine, such as DSE 530, for the resolution of unknown content.

The information flow 600 is representative of an intellectual property tracking system operating with the following elements:

| | |
|---|---|
| User | a developer of digital content within a development organization; |
| Client | such as client 570 of FIG. 5 within the local layer 500B; |
| GIPS | Global Intellectual Property System such as GIPS 516 of FIG. 5 |
| DSE | Dynamic Search Engine such as DSE 530 |
| WWW | for example World Wide Web (WWW) such as publicly and privately available information 550; and |
| Crawler | Web Crawler such as Web Crawler and Indexer 520. |

The information flow 600 begins with the detection of digital content introduced by the user at step 601 wherein the process moves from the User to the Client. The information flow 600 then proceeds to calculate the PIPS digest, see PIPS file digest supra in respect of FIG. 4, at step 602, and then extracts metadata from the digital content in step 603. The metadata is then recorded in step 604 into the media for the digital content, such as medias 426, 432 or 444 of FIG. 4. The Client then sends a request to the GIPS 640 in step 605 whereupon a PIPS lookup is performed directly or in association with a PIPS database, such as PIPS database 514.

As depicted the PIPS lookup fails in step 606 whereupon the GIPS 640 provides firstly a notification back to the Client in step 607A indicating that the digital content has not been found yet, and secondly submits a request to the DSE in step 607B. The notification in step 607A also triggers a request back to the User in step 608 to provide an annotation to the digital content. This annotation is then provided in step 608A whereupon in step 608B it is recorded into the media. The annotation is also fed forward to the DSE for use in conjunction with the metadata to begin the search to identify the digital content with the publicly available information WWW 660. This being shown as step 609.

From step 608B the annotation is sent to the GIPS in step 608C. The results from the search initiated in step 609 are returned in step 609A to the DSE. These results are processed in step 610 whereupon a match is shown as being found in step 610A. The positive identification of a match from step 610A is then returned to the GIPS from the DSE in step 611. It is also submitted to the Crawler in step 612 for a search in the location of the identified match. This submission to the Crawler being undertaken even if no matching results were found from the search of the WWW wherein no step 610A occurs although step 610 still executes.

The results from the Crawler are returned and populated into the GIPS in step 612A. If the request submitted in step 605 or a characteristic of the Client denote the requirement, then an active response is provided from the GIPS to the Client in step 613A. Optionally the Client may trigger a re-resolution call in step 613B which is sent to the GIPS, and returned in step 613C with the resolved results. In this manner the Client may periodically request a resolution of open intellectual property issues relating to digital content imported into its development environment.

Figure 7:
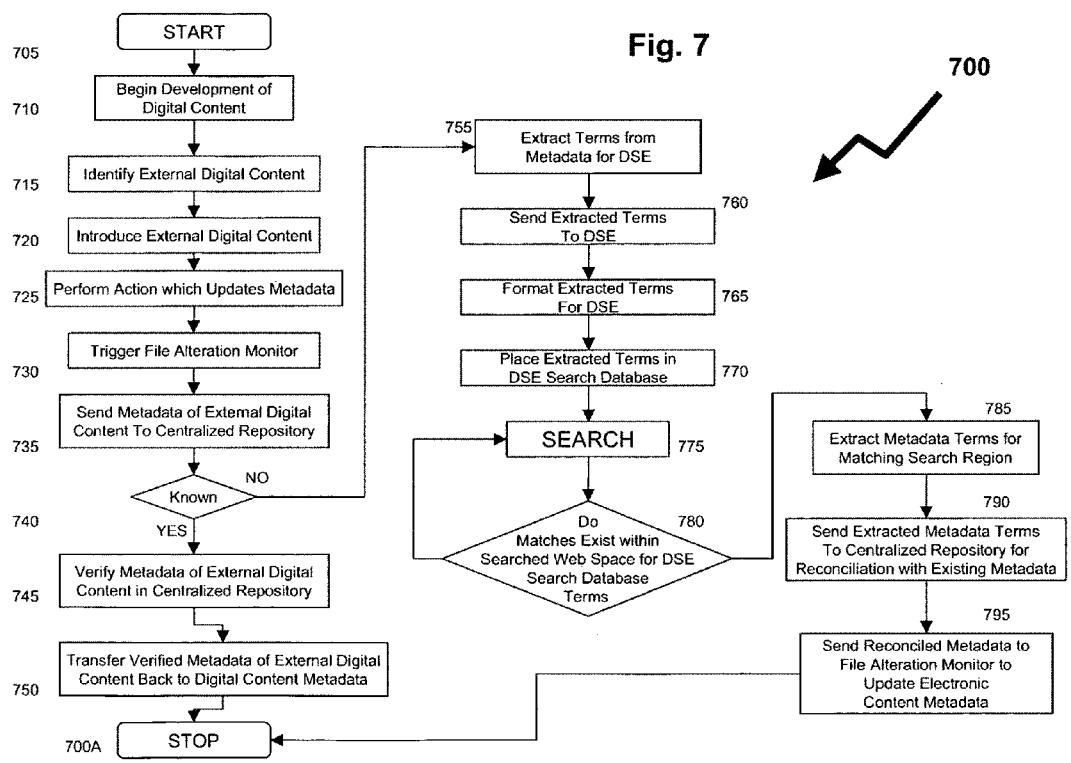
FIG. 7 depicts a simplified flow diagram of an embodiment of the invention wherein file alteration events provide modifications to the search parameters of a web searching application.

Referring to FIG. 7 there is shown a simplified flow diagram 700 of an embodiment of the invention wherein file alteration events provide modifications to the search parameters of a web searching application, such as DSE 530. As such the process starts at step 705 and proceeds to step 710 with the initiation of a development activity. At step 715 the developer identifies an item of external digital content that will form part of the final developed digital content, and is introduced into the development environment in step 720. Next in step 725 the developer performs an action which results in an update of the metadata of the digital content under development. Such an action being for example the insertion of the external digital content into the digital content under development.

The modification to the digital content in step 725 and the ensuing change in the metadata results in the file alteration monitor being triggered in step 730. As such the simplified flow 700 proceeds to step 735 with the extraction of metadata from the external digital content introduced to a centralized repository for verification and the provisioning of any missing metadata elements back to the development organization.

Upon receipt of the metadata at the centralized repository a decision is made at step 740 to determine whether the external digital content is known to the centralized repository. If the external digital content is known then the flow moves forward to step 745 whereupon the metadata within the centralized repository is used to verify the metadata extracted by the development organization when bringing the external digital content in. From this point the process proceeds to transmit the verified and complete metadata relating to the external digital content back to the digital content metadata in step 750 and moves to completion in step 700A.

If however, the external digital content is unknown then the process moves forward to step 755 from the decision step 740 whereupon terms for the Dynamic Search Engine are extracted from the metadata. These are then provided to the Dynamic Search Engine in step 760 and re-formatted, if necessary, in step 765 prior to be inserted in the Dynamic Search Engine search database. Once inserted into the Dynamic Search Engine search database then the Dynamic Search Engine continues to crawl in step 775. For each resource accessed by the Dynamic Search Engine a comparison is made to the terms within the Dynamic Search Engine search database in step 780. A failure to identify any match for terms relating to an item of external digital content results in the process looping back to the crawl step 775.

If the result of step 780 is that a term relating to the external digital content matches then the process moves ahead to step 785 wherein the metadata terms relating to the external digital content are extracted from the resource within which the match was found. These extracted metadata terms are then sent from the Dynamic Search Engine to the centralized repository for reconciliation in step 790. From the centralized repository the reconciled metadata is transferred to file alteration monitor in step 795 wherein the metadata of the digital content file and the external digital content, if stored independently, are updated. The process therein ending at step 700A.

Optionally the terms entered in the Dynamic Search Engine search database rather than being terms for which matches are sought these terms may relate to repositories or locations within the World Wide Web. Further whilst the process of FIG. 7 is presented in respect of a single matching event of the extracted terms and the searched content the Dynamic Search Engine may be tasked alternatively with finding a predetermined number of occurrences of the external digital content or all occurrences.

Alternatively in instances where the metadata is sparse or non-existent from the importing of the external digital content the Dynamic Search Engine may exploit elements of the external digital content directly. Such elements including for example key words, subroutine names, names of variables, a truncated portion of the filename, and sampled elements of the external digital content. In scenarios where the external digital content is audio-visual in nature then the Dynamic Search Engine may sample for example a predetermined length of the audio-visual content and seek to match it within a predetermined tolerance. The introduced external digital content may have been sampled by the developers prior to introduction into the digital content and hence the Dynamic Search Engine may need to correlate the sampled content with the full content of each audio-visual file identified.

Figure 8:
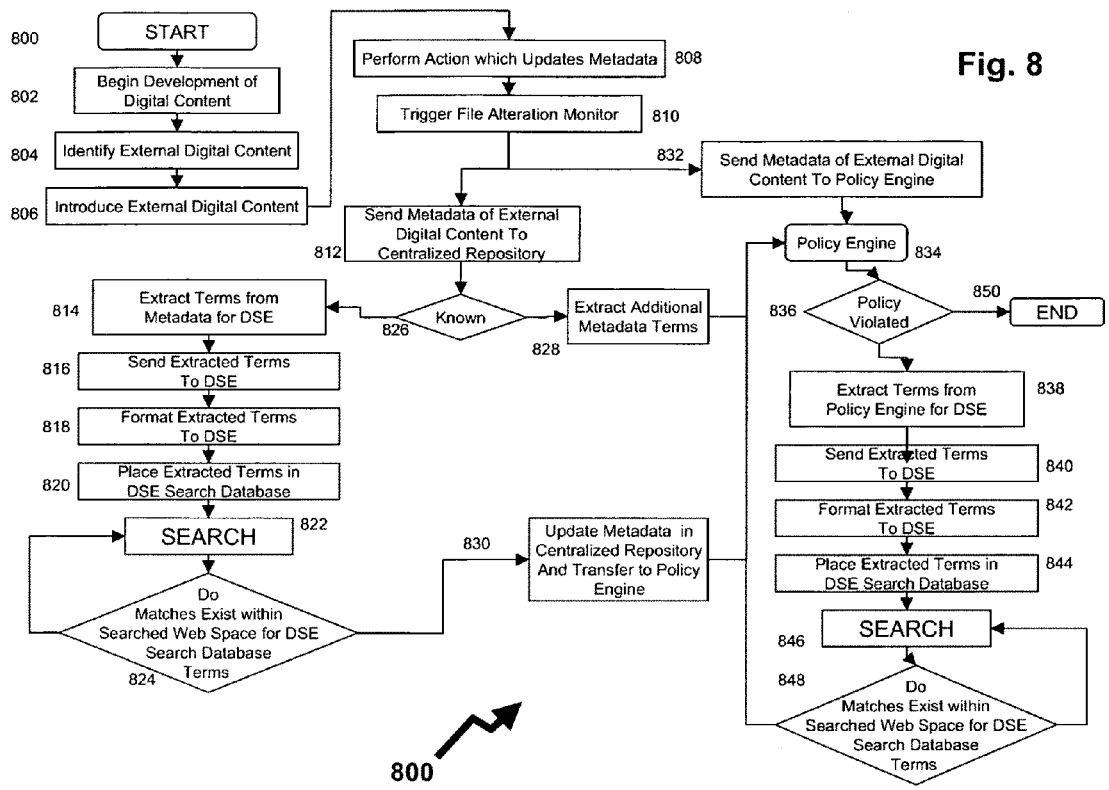
FIG. 8 illustrates a simplified flow diagram of an embodiment of the invention wherein file alteration events and policy analysis modify a web searching application seeking and extracting data relating to digital electronic content.

FIG. 8 illustrates a simplified flow diagram 800 of an embodiment of the invention wherein file alteration events and policy analysis modify a web searching application seeking and extracting data relating to digital electronic content. The process begins at step 800 with a decision to undertake an activity. At step 802 an activity begins relating to the development of a digital content, during which at step 804 a member of the development team identifies an item of external digital content which they wish to introduce into the digital content under development. At step 806 this external digital content is introduced whereupon the modified file is stored within a memory at step 808 which results in an update of the metadata associated with the file. Such a change in the metadata triggers the file alteration monitor in step 810 whereupon two sub-flows are triggered. With the first at step 812 metadata relating to the external digital content is sent to a centralized repository. At step 826 an assessment is made as to whether the external digital content is known to the centralized repository. If the external digital content is known then the process moves to step 828 wherein additional metadata terms not presented within the metadata imported with the external digital content are extracted and provided to a policy engine in step 828.

If the external digital content is not known then the process moves to step 814 wherein terms from the metadata are extracted in step 814 for the Dynamic Search Engine. These terms are sent to the Dynamic Search Engine in step 816, formatted in step 818 and placed within the Dynamic Search Engine search database in step 820. The Dynamic Search Engine continues to crawl in step 822 and determines whether sourced metadata relating to a file and location crawled matches to some extent the terms within the Dynamic Search Engine search database in step 824. Failure to identify a match results in the Dynamic Search Engine continuing with a looped return to the crawling step 822. A determination of a match results in the flow progressing to step 830 wherein the centralized repository is updated with metadata extracted from the source and external digital content wherein the match was. The process flow therein moving forward to the policy engine in step 834.

When the file alteration monitor triggered in step 810 it also sent a copy of the metadata relating to the external digital content to the policy engine in step 832 wherein the policy engine executes its process in step 834. The policy engine determines in step 836 whether the introduction of the external digital content violates a policy of the development organization. If the policy is not violated then the process moves forward to step 850 and stops. If however, the policy is violated the process moves forward to step 838 wherein terms from the policy engine metadata and processing are extracted for the search engine. These terms are then sent to the Dynamic Search Engine in step 840, formatted for the Dynamic Search Engine in step 842 and placed within the Dynamic Search Engine search database in step 844. The Dynamic Search Engine now continues to crawl in step 846 and seeks matches for the terms stored within the Dynamic Search Engine search database or is guided by these terms. At step 848 a determination of whether an identified external digital content file win a new locations has metadata matching tone or more terms within the Dynamic Search Engine search database. A failed match results in the process moving back to step 846 and the Dynamic Search Engine continues to crawl. However, a match results in the metadata of the external digital content file identified being transferred back to the policy engine wherein the loop begins again with a determination of whether the policy or policies of the development organization have been violated. In this manner the Dynamic Search Engine searches for external digital content that matches the introduced external digital content but does not violate the policies of the development organization.

Figure 9:
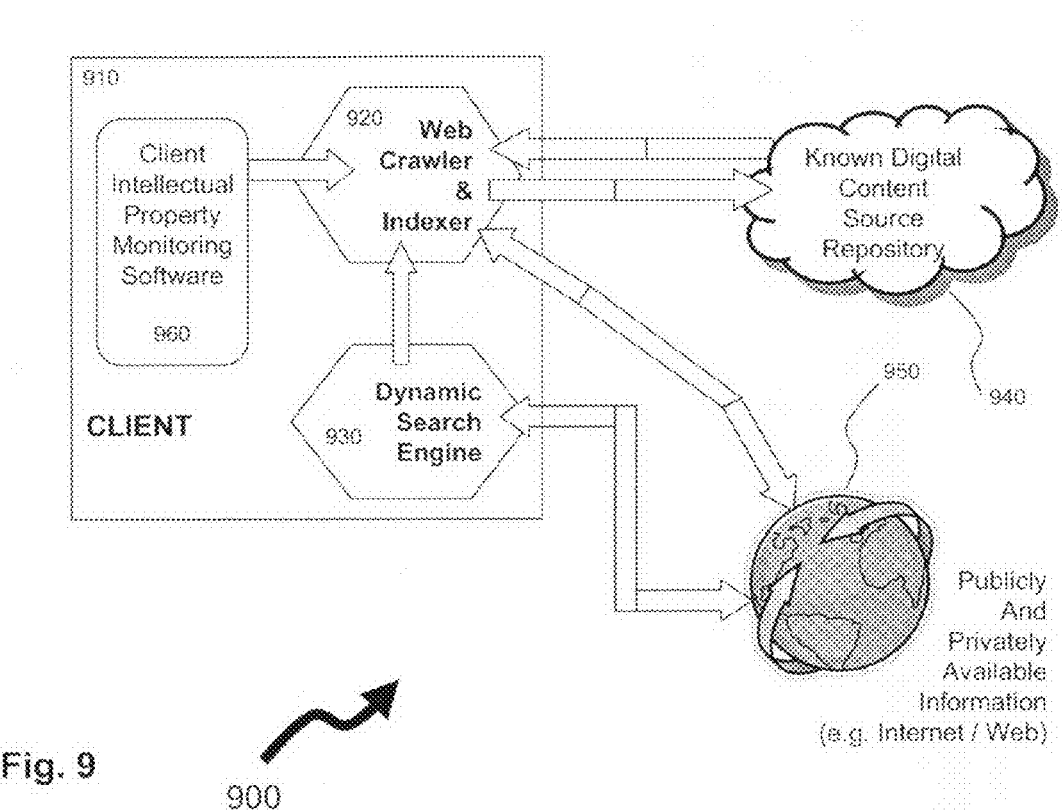
FIG. 9 illustrates an embodiment of the invention in respect of an intellectual property tracking system based on a client only architecture.

Now referring to FIG. 9 there is depicted an embodiment of the invention in respect of an intellectual property tracking system 900 based on a client only architecture. In this embodiment the client 910 operates in a stand-alone configuration without accessing a high capacity centralized intellectual property repository, such as GIPS 510 in FIG. 5 supra, but instead has in execution upon their computing system (not shown for clarity) a Client Intellectual Property Monitoring Software 960. This is interfaced to a Web Crawler & Indexer application 920 and a Dynamic Search Engine (DSE) 930. The Client Intellectual Property Monitoring Software 960 has rules established internally either by the client 910 themselves or by the digital content development organization they are working for (not shown for clarity).

Accordingly the Client Intellectual Property Monitoring Software 960 upon detecting the insertion of external digital content 970 into digital content 980 extracts metadata in respect of the external digital content and parses this to a Web Crawler & Indexer 920. This accesses Known Digital Content Source Repository 940 via the Internet to identify intellectual property information of the external digital content 970. As discussed supra in respect of FIG. 5 the Known Digital Content Source Repository 940 may include commercial repositories such as Flickr™, iStockPhoto®, GettyImages®, and iTunes™, or academic/free repositories such as Princeton Software Repository for example, or be a privately held repository, such as a development organizations internal servers.

The Web Crawler & Indexer 940 may also access the Internet to specific domains within the Publicly Available Information 950 to search repositories belonging to their own organization distributed globally for example, or repositories accessible to the client 910 under partnership agreements but not generally accessible to the public.

In the event that either no information relating to the external digital content 970 is found or partial information is returned then the metadata is parsed to a Dynamic Search Engine 930 which performs a search of the publicly available information 950 to locate the source of the external digital content 970. Once found returned intellectual property information is passed back to the Client Intellectual Property Monitoring Software 960. Additionally the location is then employed by the Web Crawler & Indexer 920 to search within the vicinity of the location to retrieve as much intellectual property information relating to the external digital content 970 as possible.

The Client Intellectual Property Monitoring Software 960 then establishes based upon the rules internally stored whether to allow the incorporation of the external digital content 970 into the digital content 980, bar the incorporation, or establish a criterion that must be satisfied prior to release of the digital content. The criterion being satisfied potentially by the subsequently retrieved information from the Web Crawler & Indexer 920 in its expanded search of the publicly available information 950.

Whilst the embodiments presented supra provide for terms to be provided to a web crawler such that upon identifying a match it updates a centralized repository, such that the next time the centralized repository compares this external digital content from another file alteration event, once a match has been identified it would be apparent to one with skill in the art that alternatively the terms provided rather than relating primarily to the external digital content file may direct the web crawler to a location within the Internet wherein external digital content is available. Optionally therefore the triggering of a file alteration event may transfer the Universal Resource Locators (URLs) accessed by the developer prior to the introduction of the external digital content. In this manner the source location is crawled, together optionally with the last one, two, or other predetermined number of URLs.

Further, the embodiments presented supra have been presented and discussed within the framework of extracting and identifying metadata relating to the external digital content and the digital content. Said metadata then forming the basis for the searching of either known digital repositories or publicly available information. However, optionally the searching by both the Dynamic Search Engine, such as DSE 930, and Web Crawler & Indexer 920 may exploit keywords or search strings and beacons.

Keywords or search strings, which are used here in synonym fashion and interchangeably, refers to a series of digital words or strings that would allow searching for a specific digital content in public domain. For instance, if one were searching for a java class that implements a secure hashing mechanism, then "java secure hash" would be one set of keywords or a search string one could use to search the web for it. Various techniques can be employed to make the search more efficient and reduce the number of false positives by choosing the most optimum search string.

Alternatively "Beacons" may be employed, where a beacon is a small sample of digital content with a specific location within the entire digital content. As such "Beacons" allow the location of a specific subsection of a digital content within the whole digital content. For instance, knowing that we are looking for a subsection of digital content that contains the sentence "Beacons stood in the wilderness issuing forth a short digital burst as a warning to those approaching to avoid the barren meteor crater" then establishing "beacons" as the first word, "crater" as the last word, and "digital" as the tenth word will typically allow the pinpointing of this sentence within the entire document.

As such establishing the set {("beacon", 1), ("digital", 10), ("crater", 23)} will establish a set of beacons for the first sentence of this section within this document. As a result having the set we can easily find, pinpoint or highlight the section of interest within the whole document. In terms of digital content being code then the beacons may be functions rather than variables such that renaming all variables does not escape comparison with the beacon set and thereby the determination of the external digital content being sourced.

Numerous other embodiments may be envisaged without departing from the spirit or scope of the invention.

What is claimed is:

1. A method comprising:
   providing at least a process of a plurality of processes, each process relating to automatically sourcing at least an element of a plurality of elements, each element relating of an aspect of an external digital content at least one of to be introduced and introduced into a digital content file, wherein an aspect of the external digital content is selected from the group comprising, a file length, a file size, a file type, a file format, an author, a copyright, a license, an owner, and an aspect of the content of the external digital content;
   providing a content development system allowing a user to work with the digital content file and operating upon a first computer;
   providing a file alteration monitor in communication with the first computer, the file alteration monitor configured with at least one metadata of a plurality of metadata to gather for the content development system;
   establishing that an event has occurred, the event determined in dependence upon a least automatically detecting when the digital content file is at least one of imported, created, moved, altered, and deleted within the content development system, the at least one of at least one of modifying the at least one metadata and adding new metadata to the plurality of metadata;
   providing the at least one of metadata and new metadata as the provided data term;
   transmitting to at least one software queue of a plurality of software queues in dependence upon establishing that an event occurred at least one of the digital content file, a predetermined portion of a plurality of metadata associated with the digital content file, and a signature associated with the digital content file;
   providing at least one policy engine of a plurality of policy engines, each policy engine polling a predetermined portion of the software queues to determine whether an event has been stored within the predetermined portion of the software queues;
   retrieving with the one policy engine upon determining that an event has been stored the event and applying at least one policy of a plurality of policies to the at least one of the digital content file, a predetermined portion of the plurality of metadata associated with the digital content file, and a signature associated with the digital content file associated with the event; and
   dispatching an action term to the memory to become one of the plurality of data terms, the dispatching determined in dependence upon at least the one policy and a result of applying the at least one policy to the at least one of the digital content file, a predetermined portion of the plurality of metadata associated with the digital content file, and a signature associated with the digital content file associated with the event.

2. An apparatus comprising:
   at least a processor, the processor executing at least a process of a plurality of processes, each process relating to automatically sourcing at least an element of a plurality of elements and each element relating to an aspect of an external digital content at least one of to be introduced and introduced into a digital content file, wherein an aspect of the external digital content is selected from the group comprising, a file length, a file size, a file type, a file format, an author, a copyright, a license, an owner, an aspect of the external content, and a specific element of the external content;
   a content development system allowing a user to work with the digital content file and operating upon a first computer comprising at least the processor;
   a file alteration monitor in communication with the first computer, the file alteration monitor configured with at least one metadata of a plurality of metadata to gather for the content development system, the file alteration monitor:
      establishing that an event has occurred, the event determined in dependence upon a least automatically detecting when the digital content file is at least one of imported, created, moved, altered, and deleted within the content development system, the at least one of at least one of modifying the at least one metadata and adding new metadata to the plurality of metadata; and
      providing the at least one of metadata and new metadata as the provided data term;
   at least one software queue of a plurality of software queues, the at least one software queue receiving data from the file alteration monitor in dependence upon establishing that an event occurred at least one of the digital content file, a predetermined portion of a plurality of metadata associated with the digital content file, and a signature associated with the digital content file; and
   at least one policy engine of a plurality of policy engines, each policy engine polling a predetermined portion of the software queues to determine whether an event has been stored within the predetermined portion of the software queues, retrieving the data stored within the software queue upon determining that an event has been stored the event and applying at least one policy of a plurality of policies to the at least one of the digital content file, a predetermined portion of the plurality of metadata associated with the digital content file, and a signature associated with the digital content file associated with the event, and dispatching an action term to the memory to become one of the plurality of data terms, the dispatching determined in dependence upon at least the one policy and a result of applying the at least one policy to the at least one of the digital content file, a predetermined portion of the plurality of metadata associated with the digital content file, and a signature associated with the digital content file associated with the event.

3. An apparatus according to claim 2 wherein,
   providing the at least one of metadata and new metadata comprises providing information relating to an aspect of at least one of the digital content file, an external content file to be combined with the digital content file, and the digital content file after being combined with the digital content file, the aspect selected from the group comprising, a file length, a file size, a file type, a file format, an author, a copyright, a license, an owner, an aspect of the external content, and a specific element of the external content.

* * * * *